Patented Apr. 19, 1927.

1,625,416

UNITED STATES PATENT OFFICE.

LEON LILIENFELD, OF VIENNA, AUSTRIA.

PLASTIC AND PROCESS OF MAKING SAME.

No Drawing. Application filed January 9, 1926, Serial No. 80,357, and in Austria May 15, 1920.

The present invention relates to the use, as plasticizing agents for alkyl and aralkyl ethers of cellulose, its conversion products and derivatives, of certain oily bodies which consist largely or entirely of saturated hydrocarbons of the aromatic series.

While I give herein a good method of preparing these oils, it is to be understood that the oils in question, prepared in any suitable manner, can likewise be employed.

In my copending application No. 727,810 filed July 23, 1924, being in part a continuation of Serial No. 465,705, a process is described and claimed, which is essentially as follows: Solvent naphtha is treated with a polymerizing agent such as those used in making coumaron resin, e. g. sulfuric acid. This treatment is similar to the making of coumaron resin, and the acid is drawn off, the oil washed until substantially neutral, the more volatile fractions are distilled off, for example at atmospheric pressure, say up to 180° C., and the residual product distilled in a vacuum, while avoiding local superheating. The fractions which distill over from the said material in vacuum when heating to between about 150° C. and 300° C., (or 180 to 300° C.,) constitute (for this example) the oily bodies used in the present invention. These oils so produced are water-white to light yellow, viscous oils having a blue fluorescence, consisting essentially of saturated hydrocarbons of the aromatic series, and have been found by me to be of great utility in the manufacture of cellulose ether plastics.

The oils which distill over between 180 and 300° C., in vacuum are especially desirable for the present invention.

The oil forming the last mentioned fraction, may be purified by being redistilled (in vacuo, preferably) and is obtained as a water-white to light yellow, viscous, fluorescent oil which consists almost completely, or completely, of saturated hydrocarbons of the aromatic series.

It will be understood that while I have, in the above specific example, mentioned solvent naphtha as the liquid to be subjected to the action of the polymerizing agent, various other hydrocarbon liquids of the aromatic series can be used, for example crude benzol, crude toluol and various oily distillates of coal tar.

In the specific example in which solvent naphtha is employed as the starting material, the oily product formed has the following properties:—

Boiling point limits: 180 to 300° C. under a vacuum of 35 mm. mercury.
Specific gravity, at 15° C.=1.15 to 1.25.
Color, water-white to light yellow.
Fluorescence blue.
Odor, slightly of aromatic hydrocarbons.
Viscosity at 20° C.=43 to 48 Engler degrees; at 50° C.=3.5 to 4.2 Engler degrees.
Molecular weight equivalent determined by the freezing and boiling point method, in phenol as solvent: 261 to 272.

These oils are very soluble in liquid aliphatic and aromatic hydrocarbons, phenol, nitro benzene, chlor-benzene, chloroform, carbon tetrachloride, carbon bisulphide, acetone, amyl alcohol and ethyl acetate. They are also somewhat soluble in methyl alcohol and are more readily soluble in ethyl alcohol and glacial acetic acid.

The oils of the present case are somewhat different from the oils of my prior U. S. Patents Numbers 1,563,203 and 1,563,204, in regard to the fluorescence. The oils of said prior patents show a very strong and very conspicuous blue fluorescence, which is conspicuous to every observer, whereas the oils of the present case are but slightly fluorescent, so that the blue fluorescence thereof may not be noticed upon a very casual inspection of the oil. As compared with the oils of said prior patents, it is stated that the oils used in the present case have considerably more plasticizing effect, than the oils of said prior patents, when using the two oils with cellulose ethers in the same proportions. The quantity of oil to be used in the present case, to give approximately the same plasticizing effect, will be about two thirds of the quantity used in the said prior patents. The oils of the present case are also rather more resistant against light and air, than the oils of the said prior patents. The oils of the present case are almost entirely saturated hydrocarbons of the aromatic series, whereas the oils of the said prior patents contain important amounts of unsaturated hydrocarbons.

It will be understood that when other oils are used instead of solvent naphtha, the boiling points and other figures above given may differ somewhat from the above.

The present invention is based on my discovery that highly useful products can be made by mixing carbohydrate ethers with the said oily materials, as herein more fully described. The ethers to be used include the alkyl and aralkyl derivatives of cellulose, starch or dextrin or of any carbohydrate having the empirical formula $n(C_6H_{10}O_5)$, or their conversion products or derivatives. The oils are the products of the process of my copending application above identified, but obviously the same oils produced in any other manner can be employed. The oils are essentially characterized by consisting largely or wholly of saturated hydrocarbons of the aromatic series.

According to the relative proportions of the said oils and the cellulose ethers, in the mixture, masses can be obtained which are either so soft and resilient that they can be used as substitutes for rubber, gutta percha, balata, glycerine-glue composition, and the like, or are harder plastic masses which are of the nature of celluloid or horn.

Mixtures of alkyl or aralkyl derivatives (ethers) of carbohydrates having the empirical formula $n(C_6H_{10}O_5)$ such as cellulose, starch, dextrin and the like, with the oils described, adapted for use in the production of the following technical products can be prepared: artificial leather, films, photographic articles or coatings of any kind, lacquers, varnishes, paints, electrical insulating material, dressings for fabrics, leather, paper and the like, sizing materials for textile material, coating material of any kind, printing material or thickening for fixing means (vehicles) for pigments, artificial thread and textile fibres, artificial hair, adhesives, cements, sizes for paper-sizing, etc. Such mixtures will hereinafter be referred to as "plastic and elastic masses."

For carrying the process into effect, alkyl, aryl or aralkyl ethers of cellulose, starch and the like (for instance ethyl ether of cellulose or benzyl ether of cellulose which are insoluble in water but soluble in organic solvents), are dissolved in a volatile solvent (such as benzene, a mixture of benzene and alcohol, carbon tetrachloride, chloroform, a mixture of chloroform and alcohol, acetone, a mixture of acetone and alcohol or the like), mixed with the oils described in application Serial No. 727,810 and worked up in any known or suitable manner so as to make one of the above mentioned products. Since the oils described in Serial No. 727,810 have a high dissolving power for the alkyl derivatives and aralkyl derivatives of cellulose, starch, dextrin and the like, it is possible when an effective stirring machine or mill is used, to obtain a series of technical products without using any ancillary solvents or by using only very small quantities of such solvents. Other plastic substances or agglutinants such as nitrate of cellulose, acetate of cellulose or other cellulose esters and the like or other colloiding agents or softening agents such as camphor, phosphoric esters of phenols, animal and vegetable oils and the like can be added to or incorporated with the mixtures of the alkyl-, aryl and aralkyl-derivatives of the carbohydrates having the empirical formula $n(C_6H_{10}O_5)$, their derivatives or conversion products and the oils described in the aforesaid specification, ancillary solvents also being used if necessary or desirable.

In order to more fully describe the invention, the following examples are given by way of illustration but it is to be understood that the invention is not restricted to these specific examples.

*1. Celluloid-like material.*

25 to 50 kilogrammes of one of the oils described in Serial No. 727,810 are mixed with 75 to 120 kilogrammes of a water insoluble ethyl-cellulose or ethyl starch or benzyl starch, optionally together with another solvent for the ether, and then treated in the usual manner for the manufacture of celluloid-like masses and products.

*2. Artificial leather.*

In a mixture of 60 parts by weight of benzene and 30 parts by weight of alcohol or in 90 parts by weight of benzene only, 10 to 15 parts by weight of an ethyl-cellulose easily soluble in the said solvents, is dissolved, and this solution is mixed with 7½ to 15 parts of one of the oils described in Serial No. 727,810. Then a pigment (such as lampblack or a lake or the like) may be added to the solution and the latter is spread in one or several layers on a suitable textile fabric or on paper. If several layers are used, it is possible to calender or press the various layers. It is also possible to mix first the pigment with one of the oils described in Serial No. 727,810 and to add the resultant mixture to the solution of cellulose-derivatives.

The artificial leather can be provided with any grain or pattern by pressing or embossing.

*3. Artificial leather.*

30 parts by weight of an ethyl-cellulose or benzyl-cellulose or ethyl starch or benzyl starch, soluble in one of the oils according to U. S. patent application, Serial No. 727,810 are mixed with 20 to 35 parts by weight of one such oils, preferably while warm, until a uniform paste or solution is obtained. With this solution, a pigment such as lamp-black or the like or a lake is mixed, after which the paste is calendered onto a suitable surface such as fabric, paper or the like in one or several layers.

It is also possible to mix together the cellulose ether or starch-ether with the oil in the presence of a very small quantity of a suitable solvent such as a mixture of benzene and alcohol or benzene.

4. *Insulating material or cables and the like.*

The substance described in Example 3, can be used for covering wires or cables in the usual manner.

The use of the described mixtures or plastic substances according to the above described process for the other purposes mentioned hereinbefore is obvious.

The present application is in part a continuation of my co-pending application Serial No. 465,704 filed April 30, 1921.

I claim:—

1. A process which comprises incorporating together (*a*) an oily product obtainable by treating an aromatic hydrocarbon material containing polymerizable material with sulfuric acid, removing the excess acid, distilling off the lower boiling products, distilling the residue in vacuo at above 150° C., such last distillate being the oily product in question, and (*b*) an ether of a carbohydrate of the empirical formula $n(C_6H_{10}O_5)$.

2. A process which comprises incorporating together (*a*) an oily product obtained by treating an aromatic hydrocarbon material containing polymerizable material with sulfuric acid, removing the excess acid, distilling off the lower boiling products, distilling the residue in vacuo at about 150° C. to 300° C., such last distillate being the oily product in question, and (*b*) an ether of a carbohydrate of the empirical formula $n(C_6H_{10}O_5)$.

3. A process which comprises incorporating together (*a*) an oily product obtainable by treating an aromatic hydrocarbon material containing polymerizable material with sulfuric acid, removing the excess acid, distilling off the lower boiling products, distilling the residue in vacuo at above 150° C., and carrying the temperature in such vacuum treatment to substantially above 240° C., and (*b*) a cellulose ether.

4. A process which comprises incorporating together (*a*) an oily product obtainable by treating an aromatic hydrocarbon material containing polymerizable material with sulfuric acid, removing the excess acid, distilling off the lower boiling products, distilling the residue in vacuo at above 150° C., such last distillate being the oily product in question, and (*b*) an alkyl ether of a carbohydrate of the empirical formula $n(C_6H_{10}O_5)$.

5. A process which comprises incorporating together (*a*) an oily product obtainable by treating an aromatic hydrocarbon material containing polymerizable material, with sulfuric acid, removing the excess acid, distilling off the lower boiling products, distilling the residue in vacuo at above 150° C., such last distillate being the oily product in question, and (*b*) an ethyl ether of a carbohydrate of the empirical formula $n(C_6H_{10}O_5)$.

6. A process which comprises incorporating together (*a*) an oily product obtainable by treating an aromatic hydrocarbon material containing polymerizable material with sulfuric acid, removing the excess acid, distilling off the lower boiling constituents by heating up to about 180° C., distilling the residue in vacuo at above 150° C., such last distillate being the oily product in question, and (*b*) an ether of a carbohydrate of the empirical formula $n(C_6H_{10}O_5)$.

7. A process which comprises incorporating together (*a*) an oily product obtainable by treating an aromatic hydrocarbon material containing polymerizable material with sulfuric acid, removing the excess acid, distilling off the lower boiling products, distilling the residue in vacuo at above 150° C., such last distillate being the oily product in question, and (*b*) an ether of a cellulosic body.

8. A process which comprises incorporating together (*a*) an oily product obtainable by treating solvent naphtha with sulfuric acid, removing the excess acid, distilling off the lower boiling products, distilling the residue in vacuo at above 150° C., such last distillate being the oily product in question, and (*b*) an ether of a carbohydrate of the empirical formula $n(C_6H_{10}O_5)$.

9. The process which comprises incorporating together (*a*) an oily product obtainable by treating solvent naphtha containing polymerizable material, with sulfuric acid, removing the excess acid, distilling off the products boiling up to about 180° C., distilling the residue in vacuo at temperatures running up to 300° C., such last mentioned distillate being the oily product in question, and (*b*) an ethyl ether of cellulose.

10. A process of making plastic and elastic masses by mixing an ether of carbohydrate with the empirical formula $n(C_6H_{10}O_5)$ with a fluorescent viscous material consisting essentially of saturated hydrocarbons of the aromatic series, which oily material is a solvent for said ether, and capable of serving as a plasticizing agent therefor.

11. Plastic and elastic masses containing an ether of a carbohydrate with the empirical formula $n(C_6H_{10}O_5)$ together with a fluorescent viscous oily material consisting essentially of saturated hydrocarbons of the aromatic series, which oily material is a solvent for said ether, and capable of serving as a plasticizing agent therefor.

12. A process for the production of a material for making plastic and elastic products and masses, artificial filaments and threads, artificial hair, films, coatings of all kinds, lacquers, varnishes, paints, insulating material, dressing and sizing material, printing material, cements, glues, sizes and the like, which comprises mixing together an ether of a carbohydrate having the empirical formula $n(C_6H_{10}O_5)$, with an oil obtained by treating a crude aromatic hydrocarbon material with a dehydrating, condensing and polymerizing agent, freeing the resulting product from fractions which boil at a low temperature and distilling the residue in vacuo, such distillate consisting essentially of saturated aromatic hydrocarbons, substantially as described.

13. A process for the production of plastic and elastic materials which comprises mixing an alkyl derivative of a carbohydrate having the empirical formula $n(C_6H_{10}O_5)$ with an oil obtained by treating a crude aromatic hydrocarbon with a dehydrating, condensing and polymerizing agent, freeing the product from fractions which boil at a low temperature and distilling the residue in vacuo, such distillate consisting essentially of saturated aromatic hydrocarbons.

14. A process which comprises incorporating together (a) an oily product obtainable by treating an aromatic hydrocarbon material containing polymerizable material with a polymerizing agent, distilling off the lower boiling products, distilling the residue in vacuo at above 150° C., such last distillate being the oily product in question and consisting essentially of saturated aromatic hydrocarbons, and (b) an ether of a carbohydrate of the empirical formula $n(C_6H_{10}O_5)$.

15. As new products of manufacture, plastic and elastic masses comprising as essential constituents a mixture of an alkyl derivative of a carbohydrate having the empirical formula $n(C_6H_{10}O_5)$ with a viscous oil obtained by treating a crude aromatic hydrocarbon material, with a dehydrating and polymerizing agent, freeing the treated material from fractions which boil at a low temperature and distilling the residue in vacuo, such distillate consisting essentially of saturated aromatic hydrocarbons, substantially as described.

In testimony whereof I affix my signature.

LEON LILIENFELD.